_United States Patent Office_  
3,393,428  
Patented July 23, 1968

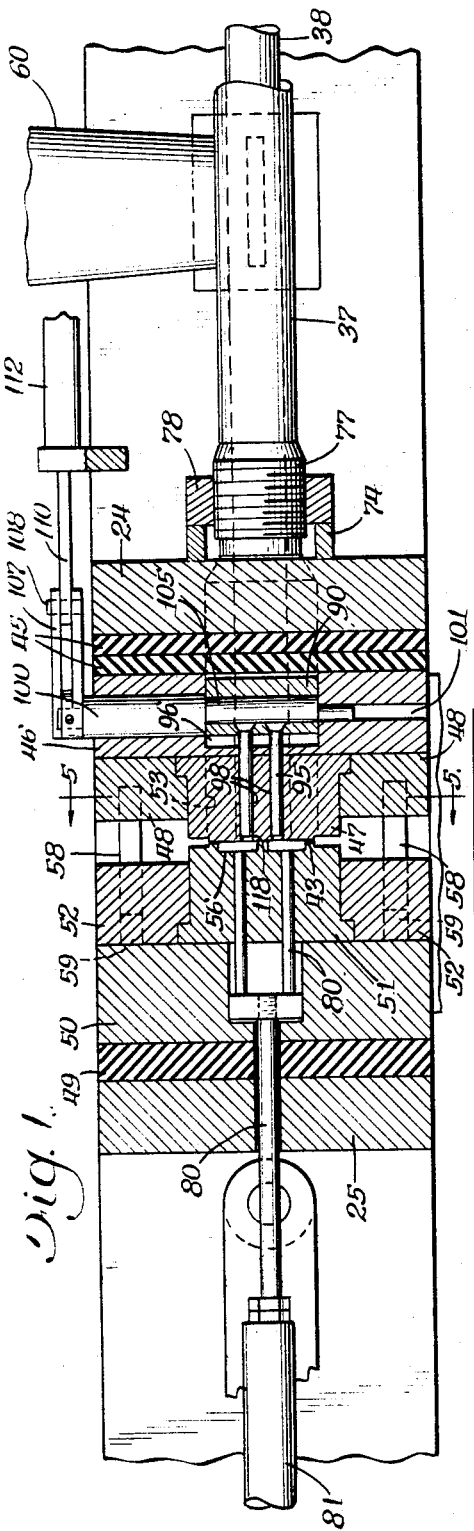

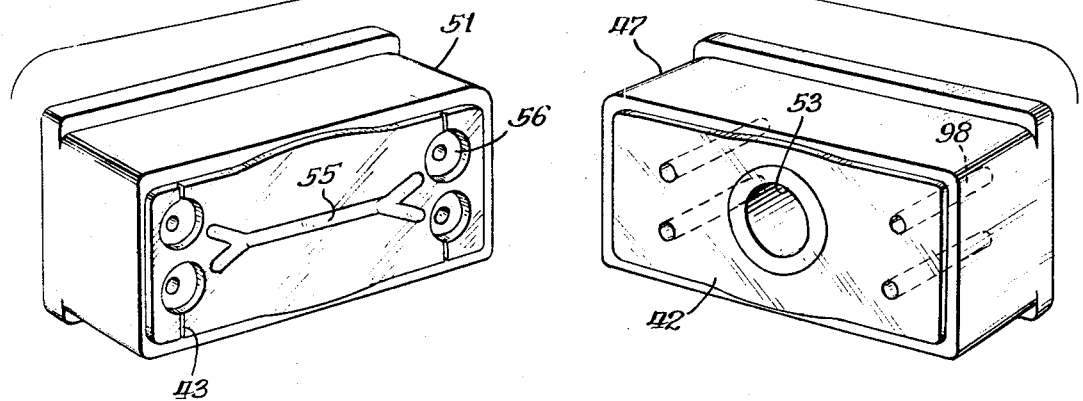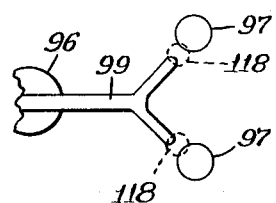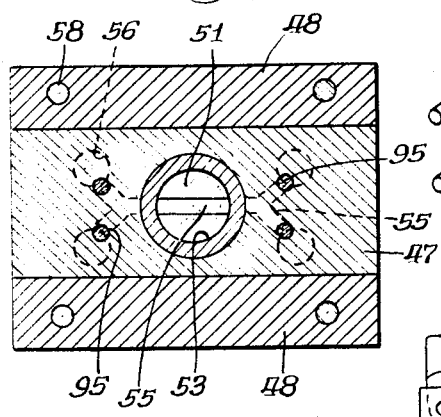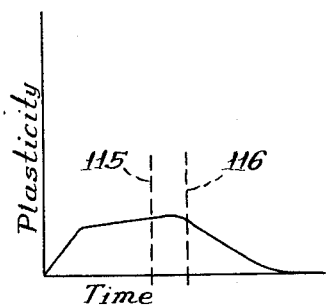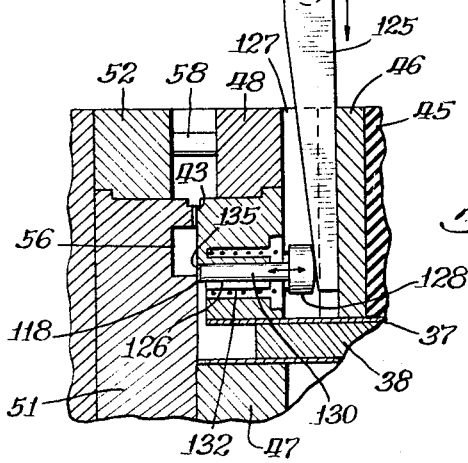

3,393,428
MOLDING APPARATUS HAVING GATE WITH CUTOFF
Ronald E. Kowalski, Glen Ellyn, Ill., assignor to Grayhill Moldtronics, Inc., La Grange, Ill., a corporation of Illinois
Filed Dec. 30, 1965, Ser. No. 517,670
5 Claims. (Cl. 18—30)

ABSTRACT OF THE DISCLOSURE

Molding apparatus wherein molding material is applied from a runner into a mold cavity through a gate, with a cutoff pin in the gate to cut off the flow of molding material. The cutoff pin can form part of the mold cavity so that all surfaces of the molded part are finished and there is no gate projection or sprue. The position of the pin in the gate can be used to regulate the flow of molded compound into the cavity and part of the cutoff pin can form a particular configuration on the molded part.

---

This invention relates to transfer molding apparatus and more particularly to such apparatus which produces molded parts which are free of a sprue or gate projection.

In transfer molding machines such as described and claimed in Patent No. 2,675,583 issued to George A Scherry, and assigned to the assignee of this invention, the mold is completely closed, and the molding compound is transferred into the cavities of the closed mold. Prior to transfer into the cavities the molding compound is loaded into a transfer cylinder. It is then forced by the transfer cylinder piston through runners to the gate area (point at which the material enters the cavity) and into the cavity. It is common to make the gate area smaller than the area of the runner so that upon removing the molded object from the mold, the runner may easily be broken away from the object. However, there remains attached to the molded object a sprue or gate projection which was cast in the gate area. The necessity of removing this sprue from the molded part increases production time and costs, provides an unfinished surface on the part, and detracts from the appearance of the part.

It is one object of this invention to provide improved transfer molding apparatus wherein there is no sprue or gate projection on the molded part.

Another object of this invention is to provide molding apparatus which decreases production time and costs by eliminating the gate projection from the molded parts.

In addition to increasing production time, removal of the gate projection exposes the filler beneath the skin layer of the molded part. This objects the molded part to attack by certain strains of fungus that cannot attack the resin rich skin layer of the finished surfaces.

It is, therefore, a further object of this invention to provide molding apparatus which provides molded parts that are not subject to fungus attack because all surfaces of the parts have a molded finish.

One feature of this invention is the provision of improved transfer molding apparatus having a cutoff pin slidably extending to the gate region between a runner and a mold cavity to block off the gate area subsequent to filling the cavity and during the period that the molding compound is still plastic. The cutoff pin and the mold blocks enclose all the surfaces of the molded part so that all such surfaces are finished, and there is no extending sprue or gate projection.

Another feature of this invention is an improved molding machine having an actuating cam for the cutoff pin which is adjustable to selectively limit the amount of withdrawal of the sliding cutoff pin when unblocking the gate area, thereby varying the opening of the gate area passage into the cavity to regulate the flow of the molding compound thereto.

Another feature of this invention is an improved transfer molding machine having a spring biasing the cutoff pin against a wedge-shaped actuating cam, which cam moves in one direction to move the pin against the spring pressure to the cavity of the mold thereby blocking the gate area and moves in a direction opposite from the one direction to permit the spring to raise the pin from the cavity at the end of the molding cycle and prior to filling the cavity at the start of the next cycle.

In the drawings:
FIG. 1 is a side elevation partially in section embodying the invention and showing the gate area open;
FIG. 2 is a top plan view of the device of FIG 1;
FIG. 3 is similar to FIG. 1 with the gate area cutoff;
FIG. 4 is a perspective view of mold blocks of this invention;
FIG. 5 is a cross-section taken along the line 5—5 of FIG. 1;
FIG. 6 is a perspective view of the cutoff pin and block;
FIG. 7 is a side elevation view of parts molded in accordance with this invention;
FIG. 8 is a plan view in cross-section of a second embodiment of the invention; and
FIG. 9 is a graph illustrating the operation of the mechanism of the invention.

In one embodiment of the invention, the mold proper consists of two mating mold blocks which form a cavity shaped to provide finished pieces of the desired configuration. The press includes a transfer cylinder, and a piston or plunger working within this cylinder intermittently feeds charges of molding power to the heated mold. Runners connect to the cylinder and extend along the surface of the parting face of one of the mold blocks. A gate area connects each runner to the cavity. When the mold is closed at the beginning of the molding cycle, the piston forces the charge through the cylinder into the mold and exerts relatively large pressure thereon so that the powder becomes plastic and flows through the runners and the gate areas into the cavities. Cutoff pins are slidably mounted in one of the mold blocks through apertures passing through the block. The pins are connected to an eccentric cam which is actuated by an air cylinder to slide the pins within the apertures. When the pins are fully extended in the block, after the cavities are filled and during the period that the molding compound is still plastic, they form a portion of the parting face thereof and block off the gate areas. The cutoff pins block the gate areas so that the sprues or gate projections are effectively eliminated and only a barely perceptible mark may be seen on the surface of the molded piece. The amount that the pins are withdrawn from the cavity prior to a molding cycle may be adjusted to vary the gate area to regulate the flow of molding compound into the cavities during the molding cycle.

In another embodiment of the invention a spring biases the cutoff pin against a wedge shaped actuating cam, which cam moves in one direction to move the pin against the spring pressure to block off the gate area and moves in a direction opposite from the one direction to permit the spring to raise the pin and unblock the gate area at the end of the molding cycle and prior to filling the cavity at the start of the next cycle.

A better understanding of the invention can be had by referring to the figures of the drawing. FIGS. 1 through 3 illustrate a molding machine having a fixed platen 24 and a moving platen 25 which form the press. Mold blocks and associated parts are secured to the platens 24 and 25 as will be more fully described. A transfer cylinder 37 cooperates with the mold block secured to the fixed platen 24 and receives therein a piston 38.

Secured ot the fixed platen 24 are insulating plates 45, backup plate 46 and mold retainer plate 48 which supports the mold block 47. The movable platen 25 has fixed thereto an insulating plate 49, backup plate 50, and mold retainer plate 52 which supports the mold block 51. The backup plates 46 and 50 include heating cartridges positioned therein, and thermostatic elements for controlling the energization thereof from the electrical circuit of the molding machine.

The mold retainer plates 48 and 52 form a mold set for supporting the mold blocks. The plates 48 and 52 are secured to the heater plates by screws and are readily removable therefrom to permit changing the mold blocks. The mold retainer plate 48 has guide pins 58 secured thereto, and the mold retainer plate 52 has openings 59 therein to receive the pins so that the mold blocks can engage each other in the proper position.

The mold block 51 (FIG. 4) has recesses 56 therein of such configuration to form a cavity mold in which the objects to be constructed are molded. The mold block 47 has an opening 53 into which the end of the transfer cylinder 37 extends substantially to and flush with the parting face 42 thereof. Runners or slots 55 in block 51 provide a passage from the transfer cylinder through the gate areas, to be described subsequently, to the molding cavities formed by the mold blocks. A threaded portion 77 (FIG. 1) is provided on the transfer cylinder for cooperating with the nut 78 which engages the end of the securing member 74 to provide a locking action to hold the transfer cylinder in place.

The material to be molded is introduced into the transfer cylinder 37 from a hopper 60. The thermosetting plastic material to be molded is provided in the hopper in powdered or granular form. After the material is placed in the transfer cylinder it is forced into the cavities 56 within the mold by the plunger 38 which slides within the transfer cylinder 37. A vent 43 connects the cavities 56 to the atmosphere for venting the cavities as they are filled.

Mechansim is provided for automatically removing the molded objects from the mold blocks. As the moving platen 25 is retracted, the piston 38 follows the movement for a short distance so that the slug is forced out of the transfer cylinder and the entire molded object is ejected from the mold block 47. The molded object will normally stick to the mold block 51. For removing the molded object from the mold block 51, knockout pins 80 are provided which extend through the movable platen 25, the insulating plate 49 and the backup plate 50 into the recesses 56 of the mold block 51. The knockout pins 80 are secured to rods 81 of the knockout mechanism (not shown).

What has been described so far is the molding machine described and claimed in the aforementioned Patent No. 2,675,583. The sprue eliminating feature of the present application can, for example, be used with this machine.

In FIG. 1 the cutoff pins 95, which are integral with block 90, slidably extend through the gate apertures 98 in the mold block 47 to block the gate area 118 (FIGS. 3 and 5) and forms a portion of the parting face of the cavities 56, as will be described in detail subsequently. A gate area 118 is formed by the end of each aperture 98, and overlap one mold cavity 56 and one end of the runner 55. In the structure shown, four gate areas are provided overlapping the four cavities.

Shown in FIG. 6 is the block 90 with a slot 92 extending the length of the block. The base 93 of the slot is shaped to receive an annular shaft. Integral with the block and extending therefrom are the two cutoff pins 95. In this particular embodiment of the invention shown, two blocks 90 are positioned in a spaced relation to each other in openings 96 in the backup plate 46, with the cutoff pins 95 slidably extending through the apertures 98 in the block 47. The tolerances of the openings 96 are great enough to permit fore and aft motion of the block 90. Shafts 100 extend vertically through the cylindrical openings 101 in the backup plate 46 and are free to rotate therein. Integral, but eccentric with the shaft 100, is cam shaft 105 which is received in slot 92 of block 90. Links 107 are pivoted to the shaft 100 and pivotally join at 108 to arm 110. The arm 110 is then connected to the air cylinder 112 which imparts fore and aft motion to the arm 110 with the pivot 108 sliding in the slots 109. The location of block 90, shaft 100 and cam shaft 105 is not critical, and they could be located, for example, in retainer 48 and mold block 47. Likewise, the pins 95 could be located in other arrangements relative to the mold block 47, the important factor being that the pins 95 block the gate area between the runners 55 and the mold cavities 56.

In operation, piston 38 operated by the air cylinder (not shown) forces the molding compound from the transfer cylinder into the space between the mold blocks 47 and 51. The piston exacts relatively large pressure on the compound so that the powder becomes plastic and is forced through the runners 55 and the gate areas 118 into the cavities formed by the recesses 56. Referring to the graph of FIG. 9, line 115 indicates the point in time at which the cavities 56 become filled with the molding compound in its plastic state. Shortly thereafter (point 116) the eccentric cams function to move pins 95 forward into engagement with the mold blocks 51 to close the gate area and cutoff the flow of material in the runners 55 before the material becomes set or rigid.

The cams are actuated in one embodiment by air cylinder 112 which moves the arm 110 to cause the links 107 to rotate the shaft 100. This causes rotation of the eccentric cams 105 in the slots 92 of blocks 90. The slots 92 translate the rotating motion into linear motion to slide the blocks 90 in opening 96 and hence the cutoff pin 95 in the apertures 98 in block 47. The cutoff pins 95 move to block the gate areas 118 and form a portion of the parting face of the cavtiy 56, thereby effectively eliminating the sprue or gate projection. When the molded pieces are removed from the cavities following a cycle of the machine, only a barely perceptible mark caused by the cutoff pin 95 can be seen on the surface of the molded piece.

The movement of the cutoff pins 95 may be adjusted, however, so that they penetrate the cavities 56 to form a port in the molded piece, or so that they block the gate area, but are neither flush with nor penetrate into the cavities 26. This latter position of the pins 95 causes a slight indentation in the parting face 42 of the mold which results in a raised shape being formed on the molded piece. It will also be apparent that the gate area into which the cutoff pin extends need not be at the parting face between the mold blocks, but may be adjacent the cavity at another point.

Elimination of the gate projection by the cutoff pin 95 is very important, because the skin layer of the molded piece is resin rich. In molding apparatus where the gate projection is not eliminated, it must be broken off. This exposes the filler and subjects the piece to a strain of fungus which will attack the filler of the molded piece, but which will not attack the resin rich skin layer. In order to protect the molded pieces that have the exposed filler, they must be individually painted at the spot where the gate projection was removed, resulting in greatly increased production costs. Further, the paint forms only temporary protection and is not nearly as effective as to have a resin rich skin layer completely about the molded piece.

After the plastic molding compound has set up, the pins 95 are retracted in the apertures 98 by action of the cam 105, (FIG. 1). By limiting the rotating motion of the cam 105 it is possible to control the amount that the pins 95 slide in apertures 98. Therefore, the pins 95 may be only partially removed from the gate area 118, to limit the area and control the flow of material into the cavity at the beginning of the next molding cycle.

FIG. 7 shows the molded parts which are removed from the cavity in the mold blocks. The gate area 118 into which the ends of the pins 95 extend is shown in dotted lines to indicate that the material has been forced out of these areas by the pins. The molded parts 97 are therefore separate from the adjoining runner portions 99 which connect to the slug 96. Therefore, when the mold opens the molded parts 97 can be dropped into separate chutes from the integral molded slug 96 and runner portions 99.

FIG. 8 illustrates the second embodiment of the invention. Wedge shaped cam 125 moves first in one direction and then in a direction opposite to said one direction in opening 127 in backup plate 46. Cam 125 rests on the head 128 of cutoff pin 130 which is slidingly received in aperture 126 in mold block 47. Spring 132 biases the pin 130 against the cam. After the cavity 56 becomes filled, cam 125 moves in a direction to move pin 130 against the pressure of spring 132 into the gate area 118 of the runner 55 to cutoff the flow of molding compound in its still fluid state. The end 135 of the pin 130 can form a portion of the parting face of that cavity. When the molding compound sets up, the cutoff pin has effectively eliminated the sprue or gate projection while leaving a barely perceptible mark on the molded part. At the end of the cycle the cam 125 moves in a direction opposite to said one direction, and the spring keeps the head 126 of the pin 130 biased against the cam to raise the pin and clear the gate area. By limiting the amount that the cam 125 is withdrawn from the opening 127, the amount the pin 130 is raised from the gate area can be controlled thereby controlling the area of the gate, and hence the rate of flow of molding compound into the cavity during the next molding cycle. The gate area may be larger than when no cutoff pin is used, so that the molding material can be forced into the cavity very rapidly to decrease the production time.

What has been described, therefore, is molding apparatus which decreases production time and costs and enhances the appearance of the molded parts by effectively eliminating the gate projection from the molded part, as an integral part of the molding operation and at a time before the molding material has set up.

I claim:

1. Molding apparatus including in combination, first and second relatively movable mold blocks having parting faces adapted to be held in engagement with each other, at least one of said blocks having a recess therein so that a cavity is formed between said blocks, runner means extending along the surface of said parting face of one of said mold blocks, a transfer cylinder forming a passage connected to said runner means, said mold blocks including means forming a gate passage between said runner means and said cavity, means for introducing molding material through said cylinder, said runner means and said gate passage into said cavity, cutoff means including an aperture in said first mold block and a cutoff pin slidably extending into said aperture and having a portion adapted to move into said gate passage between said runner means and said cavity to block the same, and actuating means for said cutoff means for moving said portion thereof in said gate passage, said actuating means moving said portion of said cutoff means to a position in said gate passage to control the flow of molding material into said cavity and moving said portion to said blocking position subsequent to filling said cavity and during the period the molding material is plastic.

2. The molding apparatus of claim 1 wherein said actuating means includes concentric cam means connected to said cutoff pin for extending the same to block said gate passage when said cavity is filled and said material is plastic, said cam means moving said pin to unblock said gate area and when said material has solidified.

3. The molding apparatus of claim 1 wherein said actuating means includes a wedge-shaped actuating cam in contact with said cutoff pin, and a spring biasing said pin into contact with said cam, with said cam moving in one direction to move said pin against said spring pressure to block off said gate passage, and moving in a direction opposite to said one direction to permit said spring to move said pin to open said gate area.

4. Molding apparatus for molding a part from thermosetting plastic material having no gate projection including in combination, first and second relatively movable mold blocks having parting faces adapted to be held in engagement with each other, at least one of said blocks having a recess therein so that a cavity is formed between said blocks, runner means extending along the surface of one of said parting faces of said mold blocks, a transfer cylinder connected to said first mold block and providing a passage to said runner means thereof, at least one of said mold blocks including means forming a gate passage between said runner means and said cavity, means for introducing thermosetting plastic molding material through said cylinder, said runner means and said gate passage into said cavity, an aperture in said first mold block, a cutoff pin slidably received in said aperture, actuating means connected to said pin for cyclicly extending the same to block said gate passage and close said cavity after said cavity is filled and while said material is plastic thereby providing molded parts that have all surfaces thereof finished, said actuating means moving said pin in said gate passage to allow the introduction of molding material therethrough into said cavity, and to control the flow of such molding material.

5. The molding apparatus of claim 4 wherein said actuating means includes cam means coupled to said pin for cyclicly extending the same to form a portion of the parting face of said first mold block and to block said gate area after said cavity is filled and while said material is plastic.

References Cited

UNITED STATES PATENTS

| 2,558,027 | 6/1951 | Wilson | 18—42 |
| 2,637,073 | 5/1953 | Walther | 18—30 |
| 2,770,011 | 11/1956 | Kelly | 18—30 |
| 2,770,025 | 11/1956 | Moller | 18—30 |
| 2,828,507 | 4/1958 | Strauss | 18—30 |

FOREIGN PATENTS

| 1,274,579 | 9/1961 | France. |
| 1,311,054 | 10/1962 | France. |

WILBUR L. McBAY, *Primary Examiner.*